June 1, 1926.

G. L. FOGLER 1,587,111

TREATING MINERAL OILS

Filed July 17, 1923

INVENTOR
George L. Fogler,
By Kay Totten Brown,
Attorneys

Patented June 1, 1926.

1,587,111

UNITED STATES PATENT OFFICE.

GEORGE L. FOGLER, OF TULSA, OKLAHOMA.

TREATING MINERAL OILS.

Application filed July 17, 1923. Serial No. 652,055.

My invention relates to the treatment of mineral oils with other liquids for the purpose of demulsifying oil emulsions.

The object of my invention is to provide a simple and efficient process for intimately mixing oils with other liquids, generally aqueous liquids, and for thereafter producing a complete separation of the oil and the added liquid.

My improved process consists, in general, in forcing the oil to be treated past an inlet through which the water or other fluid is introduced into the oil channel, causing the mixed liquids to traverse a deflector which sets up a spinning action in the advancing liquid around its axis of forward movement, and discharging the liquids while in this condition of spinning movement, into a separating tank where the liquids are permitted to separate by gravity and from which they may be drawn off continuously or intermittently, as may be desired.

Figure 1:
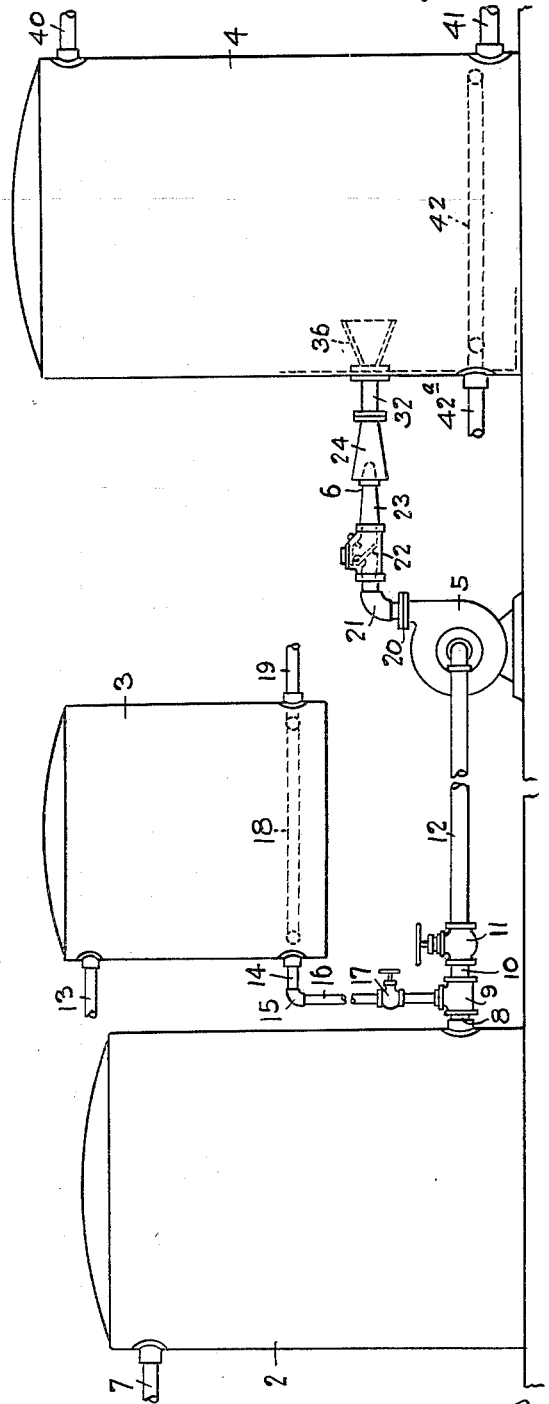
Figure 2:
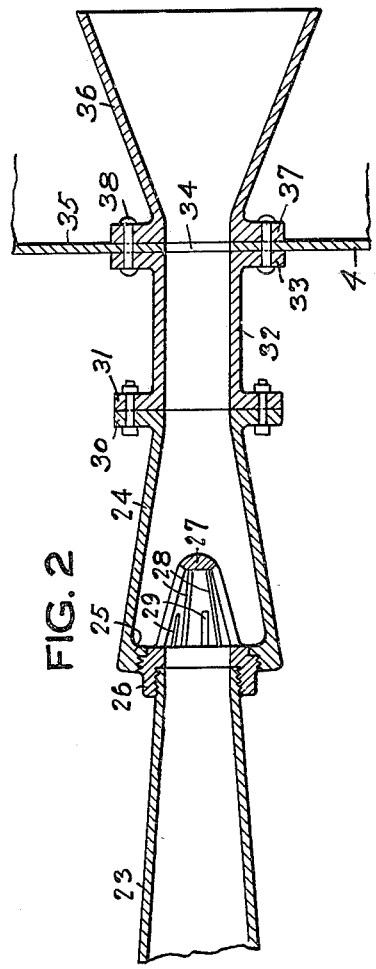

In the accompanying drawing, Fig. 1 is a side elevational view showing somewhat diagrammatically an arrangement of apparatus suitable for carrying out my invention in demulsifying oil emulsions, and Fig. 2 is an enlarged longitudinal sectional view through the deflector and its connections to the separating tank.

My process will be first described in connection with the separation of oil emulsions such, for example, as the emulsions which occur naturally in many mid-continent oil fields, and which are known in the trade as B. S. These emulsions consist of oil intimately mixed with water, and the separation of these emulsions into their constituent oil and water has long been a serious problem.

I have discovered that emulsions of the character indicated may be quickly and easily broken up and separated by mixing the emulsion with an additional quantity of water, which, for best results, should be moderately hot, suitably at a temperature between 90° F. and 120° F., and causing the mixture to rotate rapidly in a stationary enclosure. The additional water, under these conditions, breaks up the affinity between the particles of oil and water composing the emulsion, and the mixture then separates by gravity. I consider that this result is produced through the action of centripetal force acting upon the rotating mixture.

Fig. 1 of the drawing shows apparatus suitable for carrying out this process, including a flow tank 2, a water tank 3, a separating tank 4, a pump 5, and a deflector 6. The numeral 7 indicates an inlet pipe through which the emulsion to be treated is introduced into the flow tank. It will be understood that this tank is intended to represent any convenient source of the emulsion to be treated, and that it may be replaced, for example, by a trap connected directly to a pipe leading from the oil well. The flow tank 2 has an outlet pipe 8 which is connected through a T-fitting 9, a nipple 10, and a valve 11 to a pipe 12 leading to the inlet side of the pump 5.

The water tank 3 has an inlet pipe 13 and an outlet pipe 14 which is connected by an elbow 15 to a vertical pipe 16 controlled by a valve 17 and communicating with the lateral opening of the T-coupling 9. A steam coil 18 is preferably employed in the water tank 3 to maintain the water at the proper temperature, and may be supplied with steam from a suitable boiler, not shown, through inlet and outlet pipes one of which is shown at 19.

The discharge side of the pump 5 is connected by means of a flanged fitting 20 and an elbow 21 with a swinging check valve 22 to which is connected a tapered pipe 23 which forms part of the deflector 6.

The general construction of the deflector is similar to that described and claimed in my co-pending application for Letters Patent filed April 8, 1921, Serial No. 459,763. It consists, as best shown in Fig. 2, of an outer casing 24 having an internal flange 25 which is screw-threaded to receive a ring 26 that carries a hollow cone-shaped deflector member 27. The ring 26 is also internally screw-threaded for attachment to the smaller end of the tapered pipe 23.

The deflector member 27 is provided, as shown, with a series of slots 28 extending from the bottom of the deflector member, nearly to its end, and between the longer slots 28 are a series of shorter slots 29. The slots are so proportioned that they provide an outlet for the liquid issuing from the pipe 23, of substantially the same area as the area of the inlet from the pipe 23 and also substantially equal to the area of the outlet from the deflector casing 24. The cross-sectional area of the annular space around the cone 27 is likewise equal at all points to the area of the inlet and outlet of the deflector. All of the slots 28 and 29 are inclined laterally so that the liquid which passes through these slots is deflected and given a rotary and spinning movement around its axis of forward movement.

The casing 24 of the deflector is provided at its forward end with a flange 30 which is attached to a similar flange 31 carried by a tubular coupling 32 which also has a flange 33 at its opposite end. The coupling 32 registers with an opening 34 in the wall 35 of the separating tank 4, and also with an opening at the smaller end of a cone-shaped discharge nozzle 36 which has a flange 37 resting against the inner surface of the wall 35. The two flanges 33 and 37 are both connected to the wall 35 by means of bolts 38 extending through registering openings in these flanges and in the wall. Baffles, not shown may be placed in the separating tank 4, if desired, to assist in separating the oil and water.

The separating tank 4 has outlet pipes 40 and 41 connected near its upper and lower ends respectively. When the apparatus is used to separate emulsions, the oil is drawn off through the higher pipe 40 and is conducted to storage, while the water is drained off through the lower outlet 41. A steam coil 42 may be placed in the separating tank 4 to maintain the temperature of the liquids, and may be supplied with steam through inlet and outlet connections, one of which is shown at 42$^a$.

In operating the apparatus described above for the separation of oil emulsions, the emulsion to be treated is brought into the flow tank 2 through the inlet pipe 7 and is drawn out of the flow tank through the outlet 8 by the suction of the pump 5. As the emulsion passes through the T-coupling 9 it is mixed with hot water from the tank 3. As stated above, this water should be at a temperature between 90° F. and 120° F. If the water is much hotter than this it is likely to cause the emulsion to "set", in which condition the mixture cannot be separated. The pipe 12 may be jacketed with heat insulation, or with a hot jacket through which steam may be circulated in order to keep the flowing liquid hot in cold weather. Since such jacketing arrangements are common, it is not considered necessary to show them on the drawing.

From the pump 5 the mixture of water and emulsion is forced through the check valve 22 and the deflector 6 where it is set in rapid rotary motion in the manner described above. This motion continues until the mixture of water and emulsion is discharged into the separating tank 4, where the mixture expands and completes the separation of the oil and water particles. The oil and water then separate by gravity in the tank 4 and may be drawn off continuously through the pipes 40 and 41, respectively.

While I have shown and described an arrangement of apparatus which is well suited for carrying out my invention, it will be understood that the details of construction may be varied in many respects without departing from my invention, the scope of which is indicated in the appended claims.

I claim as my invention:

1. The method of treating emulsified oil that comprises establishing a moving stream of the oil, adding water to the said stream, rotating the mixture about its axis while advancing, and permitting said mixture to separate by gravity.

2. The method of treating mineral oil that comprises establishing a continuously forward moving stream of emulsified oil and water, continuously adding water to said stream, continuously rotating the mixture about its axis while advancing, and permitting said mixture to separate by gravity.

3. The method of treating mineral oil that comprises mixing an emulsion of mineral oil and water with additional water having a temperature between 90° F. and 120° F., advancing and simultaneously rotating said mixture about its axis within a confined area, and permitting said mixture to become quiescent and separate by gravity.

4. The method of treating mineral oil that comprises passing a stream of emulsion of mineral oil and water past a source of additional water having a temperature between 90° F. and 120° F., causing the mixture so produced to rotate around its axis of forward movement, discharging said mixture into a relatively large enclosure, drawing off oil from the upper part of said enclosure and draining water from the lower part of said enclosure.

5. The method of treating emulsified oil that comprises establishing a moving stream of the oil, adding water to said stream, and rotating the mixture about its axis while advancing, to effect separation of the particles of oil and water composing the emulsion.

In testimony whereof I, the said GEORGE L. FOGLER, have hereunto set my hand.

GEORGE L. FOGLER.